(12) United States Patent
Schaffer et al.

(10) Patent No.: US 8,631,454 B2
(45) Date of Patent: Jan. 14, 2014

(54) METHOD AND APPARATUS FOR CONSTRAINED DISTRIBUTION OF TELEVISION PROGRAM MATERIAL

(75) Inventors: Mark L. Schaffer, Carlsbad, CA (US);
Todd T. Kassman, Encinitas, CA (US);
James M. Stowe, San Diego, CA (US);
Kevin S. Wirick, Olivenhain, CA (US)

(73) Assignee: Motorola Mobility LLC, Libertyville, IL (US)

( * ) Notice: Subject to any disclaimer, the term of this patent is extended or adjusted under 35 U.S.C. 154(b) by 745 days.

(21) Appl. No.: 12/205,397

(22) Filed: Sep. 5, 2008

(65) Prior Publication Data

US 2010/0064308 A1    Mar. 11, 2010

(51) Int. Cl.
*H04N 7/173*    (2011.01)
(52) U.S. Cl.
USPC ............................ 725/114; 725/116; 370/485
(58) Field of Classification Search
USPC ....................... 725/25, 31, 86–105, 109, 111, 725/114–117, 143–147; 370/485–487, 370/537–540; 709/217–232; 713/150, 168, 713/176

See application file for complete search history.

(56) References Cited

U.S. PATENT DOCUMENTS

| | | | |
|---|---|---|---|
| 6,647,061 B1 * | 11/2003 | Panusopone et al. .... | 375/240.12 |
| 6,698,020 B1 * | 2/2004 | Zigmond et al. ................ | 725/34 |
| 7,010,037 B2 * | 3/2006 | Ye et al. ...................... | 375/240.1 |
| 7,376,829 B2 * | 5/2008 | Ranjan .......................... | 713/153 |
| 7,499,446 B1 * | 3/2009 | Gou et al. ..................... | 370/389 |
| 7,804,856 B2 * | 9/2010 | Krause et al. ................. | 370/486 |
| 7,864,856 B2 * | 1/2011 | Chujoh et al. ........... | 375/240.15 |

\* cited by examiner

*Primary Examiner* — Annan Shang

(57) ABSTRACT

A method of distributing video program material, includes receiving a first multi-program transport stream (MPTS) containing multiple video services and distribution constraint data specifying at least one of the video services, and creating a second transport stream that contains at least the specified video service and complies with at least one constraint specified in the distribution constraint.

16 Claims, 5 Drawing Sheets

METHOD AND APPARATUS FOR CONSTRAINED DISTRIBUTION OF TELEVISION PROGRAM MATERIAL

BACKGROUND OF THE INVENTION

This invention relates to a method and apparatus for constrained distribution of television program material.

Referring to FIG. 1 of the drawings, a television program provider, such as a company that operates a broadcast network, may operate a production facility 6 at which it produces a program signal AV having a baseband video component representing a sequence of pictures and at least one corresponding baseband audio component. In order to distribute the program signal to a wide audience of viewers, the program provider, a satellite uplink operator and a cable network operator enter into commercial arrangements whereby the program provider provides program content to the uplink operator, which delivers the content to the cable operator, which in turn delivers the content to viewers having decoding and presentation equipment connected to a cable distribution network 10.

The commercial arrangements between the uplink operator and the cable operator may provide that the uplink operator will supply certain services (corresponding to what are commonly referred to as channels, such as NBC or FOX, in the broadcast television domain) to the cable operator. The uplink operator has an interest in ensuring that the program material delivered by the cable operator to viewers meets quality standards prescribed by the program provider.

The uplink operator receives the baseband program signal AV provided by the program provider (for example on tape or by accessing a server) and supplies the program signal to an encoder/multiplexer 12, which encodes the pictures using a video coding algorithm and thereby creates a bitstream that represents a corresponding sequence of coded pictures (also known as video access units). For the purpose of this description we shall assume that the video coding algorithm produces a bitstream that conforms to the video coding standard known as MPEG 4. The encoder/multiplexer also encodes the corresponding audio signal(s) and creates a bitstream representing a sequence of coded audio frames (also known as audio access units). The encoder/multiplexer 12 packetizes the bitstreams as video and audio packetized elementary streams (PESs), encrypts the video and audio PESs, and combines the encrypted video and audio PESs with video and audio PESs for other services offered by the program provider to form an MPEG multi-program transport stream (MPTS). A transmitter 14 employs the MPTS bitstream to modulate an RF carrier and transmits the modulated carrier via a satellite transponder (not shown) to a cable distribution system headend 20. Current transponder channels have sufficient capacity (up to 77 Mb/s) to transmit an MPTS containing ten or more high definition (HD) MPEG 4 services, each corresponding to a single broadcast television channel. The uplink operator may also operate other encoder/multiplexers and transmitters for creating and transmitting other MPTSs containing other program signals via respective transponder channels.

The headend 20 includes several receivers 24 that are tuned to the transmission frequencies of the transponders respectively and recover the MPTS bitstreams from the respective RF carriers, extract the encrypted MPEG 4 bitstreams from the MPTSs, and decrypt the MPEG 4 bitstreams.

MPEG 4 provides substantially better compression of video material than the video coding standard known as MPEG 2, but there is a large installed base of MPEG 2 set top decoders. Accordingly, although the uplink operator typically transmits video material in the form of MPEG 4 data, as discussed above, the cable distribution system operator is constrained by the needs of the installed base to supply the video material to the subscribers in the form of MPEG 2 data. Therefore, the headend 20 also includes transcoders 26 that transcode the MPEG 4 bitstreams to MPEG 2, and a multiplexer 30 that creates one or more MPTSs each containing several MPEG 2 services. Transmitters 34 utilize respective cable channels to transmit the MPEG 2 MPTSs to subscriber nodes over the cable network 10.

The decoding and presentation equipment at a subscriber node may include a set top decoder 38 and a television set 40. The set top decoder includes suitable devices for selecting a service based on a channel selection command provided by the subscriber, typically using a remote control unit, decomposing the cable channel MPTS that contains the selected service, and decoding the audio and video bitstreams for the selected service to create suitable audio and video signals for driving the television set 40.

Each cable distribution channel may be limited to a 38.8 Mb/s data rate. Different types of programming require different data rates to provide satisfactory viewing experiences. For example, an HD sports service generally requires a considerably higher bit rate (perhaps 17 Mb/s) than an HD movie service (15 Mb/s), which in turn requires a considerably higher bit rate than an SD sports service (3 Mb/s).
In order to optimize utilization of the capacity of the cable channel, the MPEG 2 services may be statistically multiplexed. Statistical multiplexing is commonly used to compose an MPTS having a maximum bit rate that is less than the sum of the peak bit rates of the individual program streams. Currently, the manner in which the statistical multiplexing process allocates bit rate to the MPEG 2 services is under control of the cable operator, and the manner in which the cable operator exercises this control might not always be in accordance with the wishes of the uplink operator or program provider. For example, a program provider might provide three services with the intention that one of these services should be presented with a higher quality even at the expense of one of the other services, and the cable operator might not always allocate bit rate in a manner that is consistent with this goal.

SUMMARY OF THE INVENTION

In accordance with a first aspect of the disclosed subject matter there is provided a method of distributing video program material, including receiving a first multi-program transport stream (MPTS) containing multiple video services and distribution constraint data specifying at least one of said video services, and creating a second transport stream containing at least said one video service, wherein the second transport stream complies with at least one constraint specified in the distribution constraint data.

In accordance with a second aspect of the disclosed subject matter there is provided apparatus for distributing encoded video services, comprising an input section for receiving n video services, where n is an integer, encoded in accordance with a first compression standard and for receiving distribution constraint data for m of the video services, where m is an integer greater than 1 and not greater than n, in-band with the video services, a transcode section for transcoding the m video services from the first compression standard to a second compression standard, and an output section for creating and outputting the m transcoded video services as a multi-program transport stream (MPTS) that complies with at least one constraint specified in the distribution constraint data.

In accordance with a third aspect of the disclosed subject matter there is provided a computer readable medium containing instructions that, when executed by a computing machine receiving a first multiprogram transport stream (MPTS) containing multiple video services and distribution constraint data specifying at least one of said video services, cause the computing machine to create a second transport stream containing at least said one video service, wherein the second transport stream complies with at least one constraint specified in the distribution constraint data.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

An uplink operator negotiates with a cable operator to provide television program services desired by the cable operator and determines how many cable MPTSs (each containing three HD MPEG 2 services) will be required to supply these services to the subscribers and which services should be provided in a given cable MPTS in order to optimize use of the cable channel without impairing the quality of services. The uplink operator's determination will be based in part on the service packages offered by the cable operator and on the bit rate requirement of the different services. For example, it would not generally be desirable to allocate more than one HD sports service to a given cable MPTS because of the high bit rate required for a satisfactory viewing experience. Let us assume that the uplink operator and the cable operator determine that m cable MPTSs will be needed.

The commercial arrangements between the uplink operator and the cable operator require that for each cable MPTS the cable operator utilize an integrated receiver/decrypter (IRD) having specific features and that the cable MPTS produced by the IRD should contain services specified by the uplink operator. In practice, of course, the cable operator will utilize m IRDs, producing respective cable MPTSs, to provide the services offered by the cable operator to its subscribers.

Figure 1:
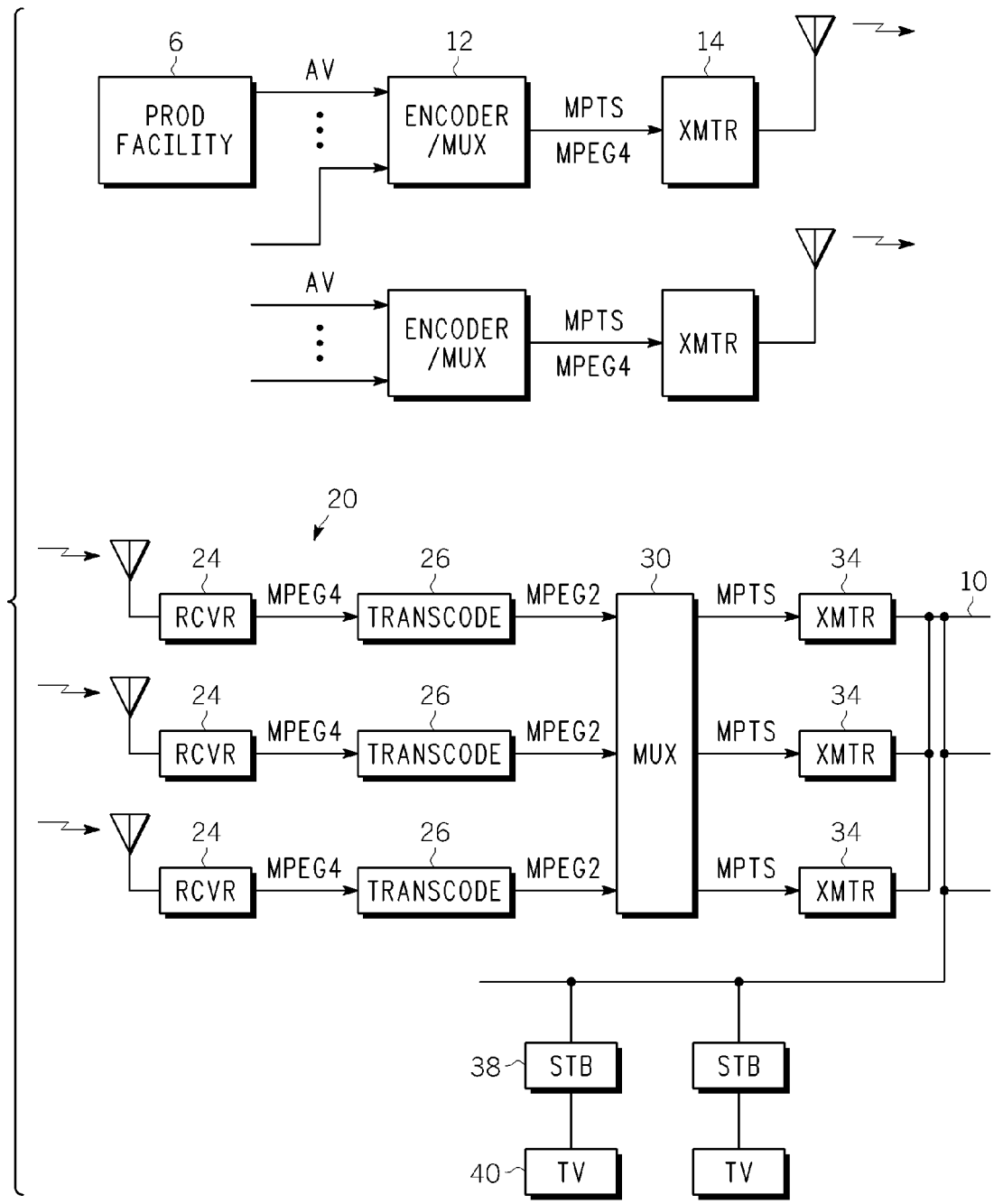
FIG. 1 is a schematic block diagram illustrating a system for distributing television program material to viewers.
Figure 2:
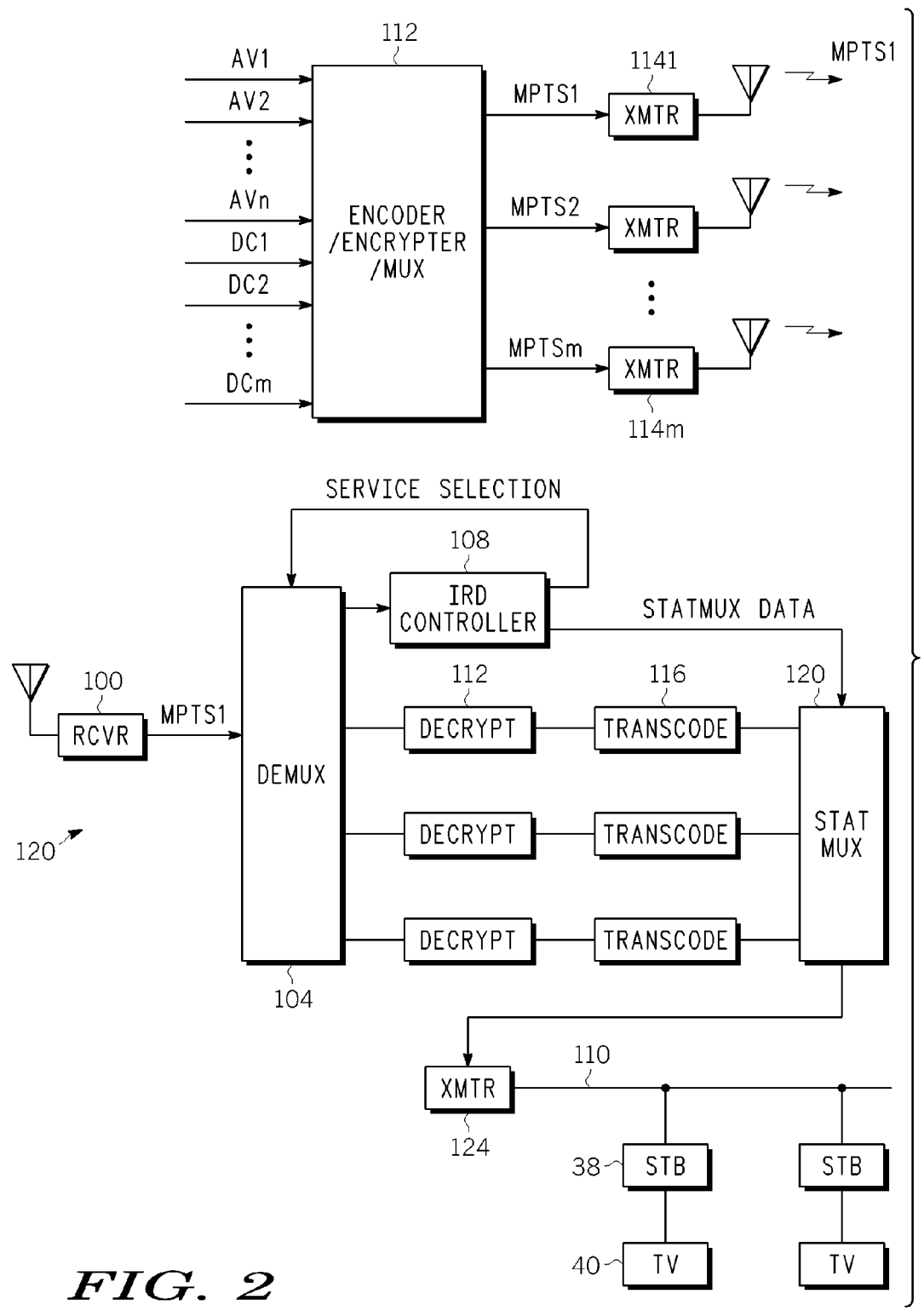
FIG. 2 is a schematic block diagram illustrating a system including headend equipment embodying the invention for distributing television program material to viewers.

Referring now to FIG. 2, the uplink operator supplies several baseband signals AV1-AVn provided by a television program provider to an encoder/encrypter/multiplexer 112 (referred to hereinafter simply as the multiplexer 112). The signals AV1-AVn may be in the HD-SDI format specified in SMPTE 292M, with the audio component embedded in the ancillary data space. The uplink operator also supplies m distribution constraint signals (one for each cable MPTS) that convey distribution constraint data DC1-DCm to the multiplexer 112. The nature of the distribution constraint data embodied in the distribution constraint signals will be discussed in more detail below, but it is sufficient at this point to say that the multiplexer 112 generates m MPTSs where MPTSj (j=1 . . . m) contains as many as ten HD MPEG 4 services and a packetized data elementary stream containing the distribution constraint data DCj. Since the distribution constraint data is included in the same MPTS as the services, it is in-band with the services.

Transmitters 114j employ the MPEG 4 MPTS bitstreams to modulate respective RF carriers and transmit the modulated carriers via respective satellite transponders to the cable distribution system headend 120. The headend 120 includes m IRDs, only one of which is shown in FIG. 2. The IRD is partially under control of the uplink operator by means of the distribution constraint data.

Figure 3:
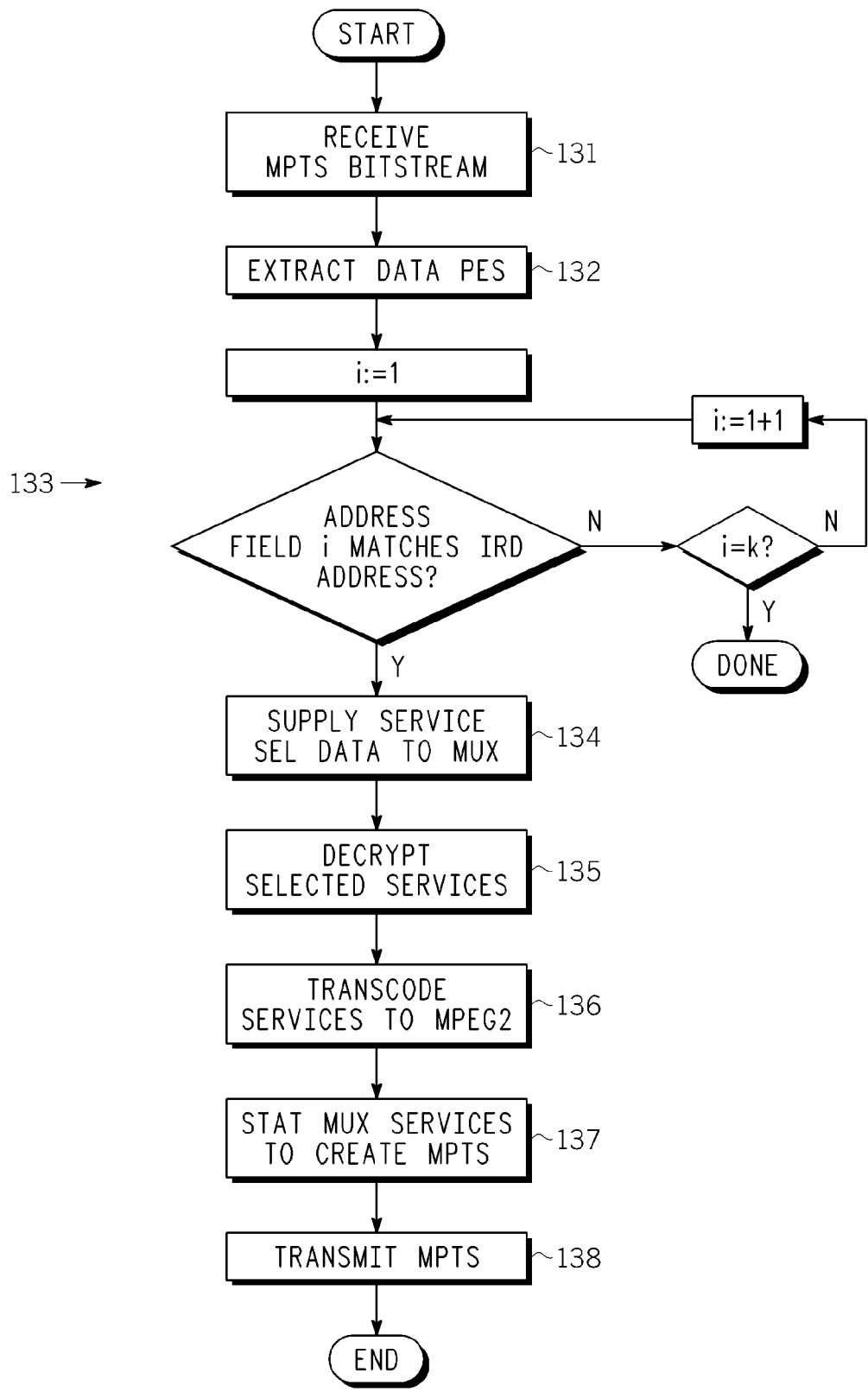
FIG. 3 is a flow chart illustrating operation of the headend equipment of the system shown in FIG. 2.

Referring to both FIG. 2 and FIG. 3 of the drawings, the IRD includes a receiver 100 that is tuned to one of the m satellite transponder channels and thus receives a carrier that is modulated with a multi-program transport stream containing, for example, ten encrypted MPEG 4 services. Assume that the IRD is tuned to the transponder channel that conveys MPTS1 and that MPTS1 contains services AV1-AV10. The receiver demodulates the carrier and outputs the MPTS bitstream, which contains not only the ten encrypted MPEG 4 services AV1-AV10 but also the packetized data stream that contains the distribution constraint data DC1, to a demultiplexer 104. The demultiplexer 104 receives (FIG. 3, step 131) the MPTS and extracts the packetized data stream (step 132), which conveys the distribution constraint data, from the MPTS and supplies the data stream to an IRD controller 108.

The IRD has a unique access control address (similar in function to the MAC address assigned to a network adapter). The distribution constraint data is in the form of vectors each having an access address field, a service selection field and a statmux field. The uplink operator generates the distribution constraint data based on the commercial arrangements with the cable operators. For example, for each IRD that is designated to transmit a cable MPTS containing one or more of the services contained in MPTSj, the distribution constraint data conveyed by the data stream included in MPTSj contains a vector that includes the access control address of the designated IRD, service selection data identifying the services that are to be included in the cable MPTS produced by the IRD, and statmux data (discussed below) for each of those services. The service selection data that is recovered from the MPEG 4 MPTS specifies the three services that are to be included in the MPEG 2 MPTS.

Suppose, for example, that k IRDs are designated to transmit a cable MPTS containing one or more of the services contained in MPTSj and the particular IRD shown in FIG. 2 is designated to produce a cable MPTS containing the services AV1, AV2 and AV3.

The IRD controller 108 compares the address field of the vector i (i=1–k) with the access control address of the particular IRD (133) and selects the particular vector whose address field matches. The IRD controller supplies the service selection data contained in the selected vector to the demultiplexer 104 (step 134), which employs this information to select (in this case) the PESs for the services AV1, AV2 and AV3. The IRD controller also outputs the statmux data contained in the selected vector. If the access control address of the IRD does not match the address field of any of the distribution constraint data vectors, the IRD is not enabled to utilize the audio and video PESs in MPTS1 to create a cable MPTS.

The demultiplexer supplies the encrypted audio and video PESs for the three selected services AV1, AV2 and AV3 to respective decrypters, which decrypt the selected services (step 135) and supply the respective decrypted MPEG 4 audio and video PESs to respective transcoders 116. The transcoders convert the MPEG 4 PESs to corresponding MPEG 2 PESs (step 136). The transcoder may decode the MPEG 4 video access units and create a sequence of decoded pictures and then encode the pictures using an MPEG 2 coder. The transcoding may alternatively be accomplished without completely decoding the MPEG 4 video access units. However, because the frequency decomposition algorithms for MPEG 4 and MPEG 2 are different, it will generally be necessary to decode the MPEG 4 video access units at least to the level of blocks of chroma and luma values.

The transcoders 116 supply the audio and video PESs of the three MPEG 2 services to a statistical multiplexer 120 for creating a multi-program transport stream. The three program streams are statistically multiplexed (step 137) in order to fit in the available 38.8 Mb/s bit rate of a cable channel, but bit rate allocation decisions are made on the basis of the statmux data provided by the IRD controller 108. The statmux data may, for example, specify minimum bit rate and maximum bit rate for each service. By including the statmux data in the transponder MPTS, the uplink operator is able to ensure that the MPEG 2 services meet the quality standards set by the uplink operator or program service provider.

The MPTS created by the statistical multiplexer 120 is supplied to a transmitter 124, which modulates an RF carrier with the MPTS bit stream in accordance with a quadrature amplitude modulation (QAM) scheme and transmits (step 138) the modulated carrier over the cable network 110 to subscriber nodes.

Another cable operator may be authorized to distribute a cable MPTS containing services AV1, AV2 and AV4. This cable operator employs headend equipment including an IRD (not shown) having a receiver that is tuned to the transponder that conveys MPTS1 and the vector that includes the access control address of that IRD includes service selection data that specifies the services AV1, AV2 and AV4 and statmux data for those three services.

Figure 4:
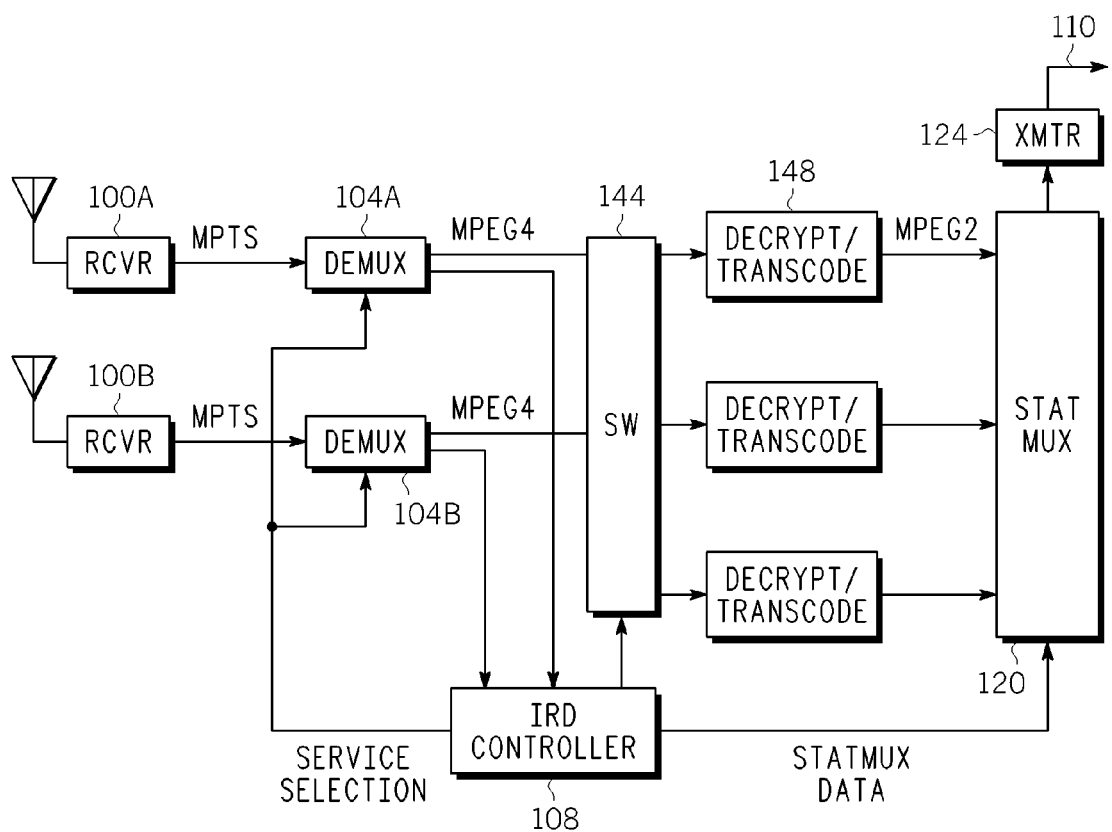
FIG. 4 is a schematic block diagram illustrating a first modification of the headend equipment shown in FIG. 2.

The IRD shown in FIG. 2 is a simplified embodiment of the subject matter disclosed in this application. A more preferred embodiment of the subject matter is shown in FIG. 4. The IRD shown in FIG. 4 has dual receivers 100A, 100B tuned to different transponder channels. For example, the receiver 100A might receive the carrier that is modulated with the bit stream of MPTS1, as in the case of FIG. 2, whereas the receiver 100B might receive the carrier that is modulated with the bit stream of MPTS3, containing services AV21-AV30 (and DC3). In this case, the arrangements between the uplink operator and the cable operator may provide that the IRD should provide a cable MPTS that contains, for example, AV1, AV2 and AV21.

The two receivers 100A, 100B demodulate the respective carriers and output the MPTS bit streams to respective demultiplexers 104A, 104B, which supply the packetized data streams containing distribution constraint data DC1 and DC3 to the IRD controller 108. The IRD controller supplies the service selection data for the two transponder MPTSs to the demultiplexers 104A and 104B respectively, and supplies the statmux data for the selected services to the statistical multiplexer 120. Three outputs of each demultiplexer 104A, 104B are connected to a routing switch 144 which, responsive to the IRD controller, selects the appropriate combination of outputs and routes the selected outputs to respective decrypter/ transcoders 148. As described with reference to FIG. 2, each decrypter/transcoder 148 decrypts the MPEG 4 audio and video PESs and converts the MPEG 4 PESs to corresponding MPEG 2 PESs. As also described with reference to FIG. 2, the three MPEG 2 bit streams are supplied to the statistical multiplexer 120 for creating a cable MPTS, which is transmitted over the cable network 110.

Currently, some uplink operators provide both HD services and SD services to cable operators in order to enable the cable operators to accommodate customers who do not subscribe to HD service. However, in case the uplink operator should discontinue providing SD services, the transcoder 116 may convert the incoming HD service to SD service in order to accommodate customers who do not subscribe to the HD level of service. Thus, referring to FIG. 5, the transcoder may not only convert the HD MPEG 4 video access units to pictures and encode the pictures as HD MPEG 2 pictures but also downconvert (150) the decoded HD pictures to SD and encode (152) the SD pictures as SD MPEG 2 pictures and thus provide an SD MPEG 2 service in addition to the HD MPEG 2 service. The SD MPEG 2 bit streams are supplied to a statistical multiplexer 154 that creates a cable MPTS for transmission over the cable 110. It will be appreciated that the SD cable MPTS may contain more than three services.

Figure 5:
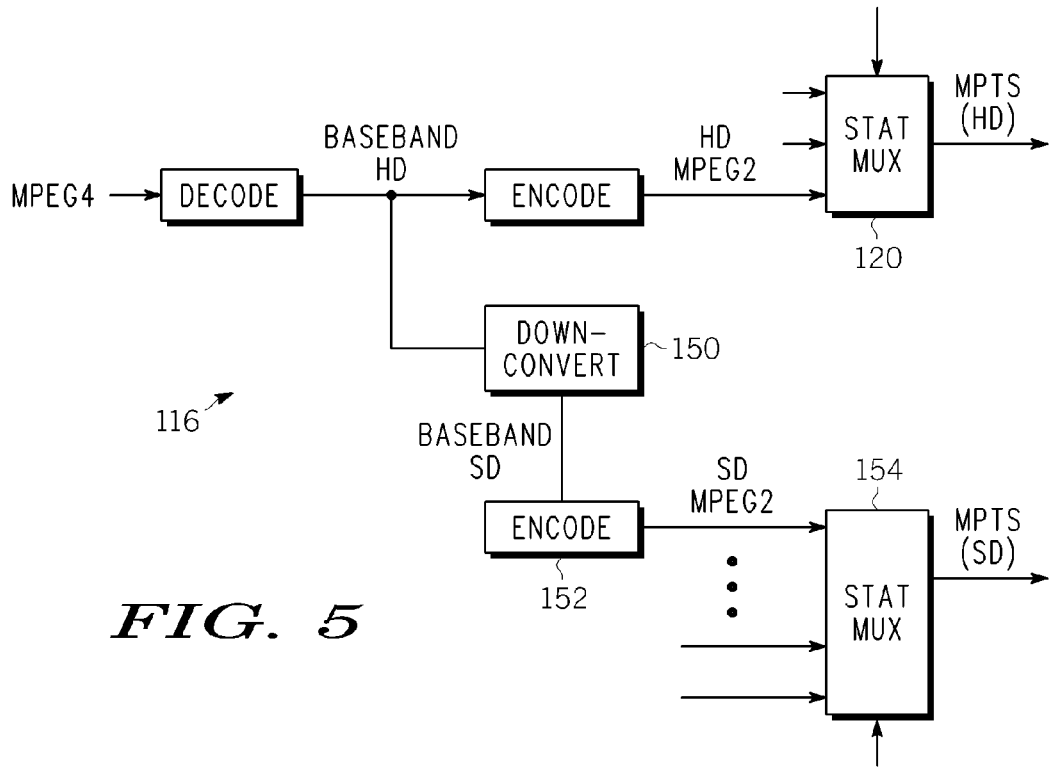
FIG. 5 is a schematic block diagram illustrating a second modification of the headend equipment shown in FIG. 2.

The distribution constraint data provided to the IRD that includes the transcoder shown in FIG. 5 includes the service selection data for the demultiplexer and statmux data for controlling the statistical multiplexers 120 and 134 and, in addition, may contain picture format data utilized by the downconverter 130 to determine how the 16×9 aspect ratio of the HD picture format should be adapted to the 4×3 aspect ratio of the SD picture format.

Although FIG. 5 illustrates two statistical multiplexers 120 and 154 creating an HD MPTS and an SD MPTS respectively, it will be appreciated that SD services and HD services may be included in the same MPTS. For example, instead of providing one MPTS containing HD services and another MPTS containing SD services, it may be preferable to provide two HD services and the corresponding SD services in the same MPTS.

Although the description with reference to FIGS. 2-5 indicates that each transponder MPTS conveys only the distribution constraint data for the IRDs that are authorized to receive that particular transponder MPTS, the distribution constraint data is relatively static and accordingly it may be possible for each transponder MPTS to contain the distribution constraint data pertaining to all of the services. In addition, although the disclosed subject matter has been described with reference to distribution of television program material, it will be appreciated that the disclosed subject matter is also applicable to distribution of other video material, such as motion pictures by video-on-demand service.

Figure 6:
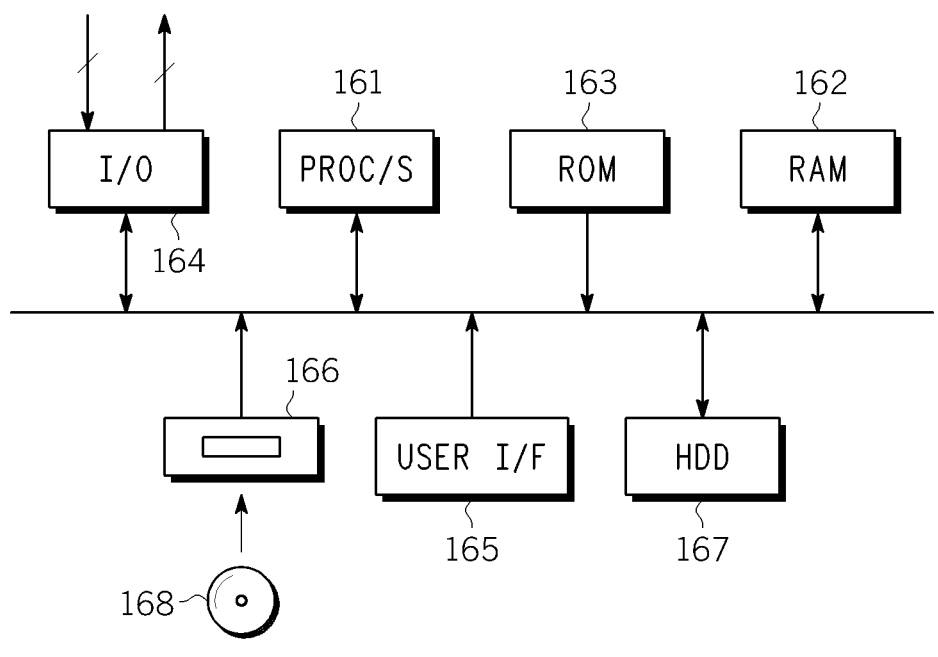
FIG. 6 is a block schematic diagram of a computing machine that may be used to implement parts of the headend equipment shown in FIG. 2, 4 or 5.

Referring to FIG. 6, suitable headend equipment may be implemented using a computer 160 comprising one or more processors 161, random access memory 162, read only memory 163, I/O devices 164, a user interface 165, a CD ROM drive 166 and a hard disk drive 167, configured in a generally conventional architecture. The computer operates in accordance with a program that is stored in a computer readable medium, such as the hard disk drive 167 or a CD ROM 168, and is loaded into the random access memory 162 for execution. The program is composed of instructions such that when the computer receives a bit stream representing an MPTS including a packetized data elementary stream, as described above, by way of a suitable interface included in the I/O devices 164, the computer allocates memory to appropriate buffers and utilizes other suitable resources and functions to perform the various operations that are described above as being performed by the headend equipment, with reference to the flow chart shown in FIG. 6.

It will be appreciated by those skilled in the art that the program might not be loadable directly from the CD ROM 168 into the random access memory utilizing the CD ROM drive 166 and that generally the program will be stored on the CD ROM or other program distribution medium in a form that requires the program to be installed on the hard disk drive 167 from the CD ROM 168.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A method of distributing video program material, including:
   receiving, by a cable distribution system, a first multi-program transport stream (MPTS) containing multiple video services and distribution constraint data specifying at least one of said video services, and
   creating, by the cable distribution system, a second different transport stream containing the at least one video service, wherein the second transport stream complies with at least one constraint specified in the distribution constraint data;
   comparing an address field of the distribution constraint data with a unique access control address of a receiving equipment at the cable distribution system; and
   enabling the receiving equipment in the event of a match between the address field and the access control address of the receiving equipment.

2. A method according to claim 1, wherein the distribution constraint data specifies at least first and second video services and the step of creating the second transport stream includes multiplexing the specified services to form the second transport stream.

3. A method according to claim 1, wherein the distribution constraint data specifies first and second video services and statistical multiplexing parameters for the first and second services, and the step of creating the second transport stream includes statistically multiplexing at least the first and second services based on the statistical multiplexing parameters specified in the distribution constraint data.

4. A method according to claim 1, wherein at least said one video service included in the first MPTS is encoded in accordance with a first video compression standard and the method further comprises extracting said one video service from the first MPTS at the distribution location, transcoding said one video service to a second compression standard that is distinct from the first compression standard, and incorporating the transcoded video service in the second transport stream.

5. A method according to claim 1, wherein at least said one video service included in the first MPTS complies with a high definition signal format and the method further comprises extracting said one video service from the first MPTS, converting said one video service to a standard definition signal format, and including the standard definition signal format video service in the second transport stream.

6. A method according to claim 5, comprising creating a third transport stream containing said one video service in a high definition signal format.

7. A method according to claim 1, wherein the first MPTS contains encrypted video data encoded in accordance with a first video compression standard, and the step of creating the second transport stream includes demultiplexing the encrypted video data from the first MPTS, decrypting the encrypted video data, at least partially decoding the decrypted video data, and encoding the at least partially decoded video data in accordance with a second video compression standard.

8. A method according to claim 7, wherein the step of creating the second transport stream further comprises multiplexing the video data encoded in accordance with the second coding standard with at least one other video service.

9. Apparatus for distributing encoded video services, comprising:
   an input section for receiving a first multi-program transport stream (MPTS) containing n video services, where n is an integer, encoded in accordance with a first compression standard and for receiving distribution constraint data for m of the video services, where m is an integer greater than 1 and not greater than n, in-band with the video services,
   a transcode section for transcoding the m video services from the first compression standard to a second compression standard, and
   an output section for creating and outputting the m transcoded video services as a second different multi-program transport stream (MPTS) that complies with at least one constraint specified in the distribution constraint data.

10. Apparatus according to claim 9, wherein the input section has an input port for receiving the n video services wherein the input section comprises a transport stream demultiplexer for separating the m video services from the multi-program transport stream and providing the m video services to the transcode section.

11. Apparatus according to claim 10, further comprising a controller for controlling the transport stream demultiplexer, and wherein the transport stream demultiplexer separates the distribution constraint data from the first multi-program transport stream and provides the distribution constraint data to the controller, and the controller supplies service selection data included in the distribution constraint data to the transport stream demultiplexer for identifying the m video services to be separated from the multi-program transport stream.

12. Apparatus according to claim 11, wherein the output section includes a statistical multiplexer for statistically multiplexing the m transcoded video services, the distribution constraint data includes statistical multiplexing data pertaining to at least one of the m video services, the controller supplies the statistical multiplexing data to the statistical multiplexer, and the statistical multiplexer creates the MPTS in compliance with the statistical multiplexing data.

13. Apparatus according to claim 9, wherein the transcode section includes a decrypter for decrypting at least one of the m video services.

14. Apparatus according to claim 9, wherein the input section comprises a first transport stream demultiplexer for receiving a transport stream containing n1 video services, where n1 is an integer less than n, encoded in accordance with the first compression standard and for receiving distribution constraint data for m1 of said n1 video services, where m1 is an integer, and a second transport stream demultiplexer for receiving n2 video services, where n2 is an integer and n1+n2=n, encoded in accordance with the first compression standard and for receiving distribution constraint data for m2 of said n2 video services, where m2 is an integer and m1+m2=m, and a routing switch for receiving said m1 video services from the first transport stream demultiplexer and n2 video services from the second transport stream demultiplexer and providing said m video services to the transcode section.

15. Apparatus according to claim 9, wherein the transcode section includes a decoder for decoding at least one of the m video services from the first compression standard to baseband data, a downconverter for downconverting the baseband data from a high definition signal format to a standard definition signal format, and an encoder for encoding the downconverted baseband data in accordance with the second compression standard.

16. A non-transitory computer readable medium containing instructions that, when executed by a computing machine receiving a first multiprogram transport stream (MPTS) containing multiple video services and distribution constraint data specifying at least one of said video services, cause the computing machine to:
 create a second different transport stream containing at least said one video service, wherein the second transport stream complies with at least one constraint specified in the distribution constraint data, and
 further cause the computing machine to compare an address field of the distribution constraint data with an access control address of a receiving equipment in the computing machine, wherein the receiving equipment is enabled in the event of a match between the address field and the access control address of the receiving equipment.

* * * * *

UNITED STATES PATENT AND TRADEMARK OFFICE
CERTIFICATE OF CORRECTION

PATENT NO. : 8,631,454 B2
APPLICATION NO. : 12/205397
DATED : January 14, 2014
INVENTOR(S) : Schaffer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 871 days.

Signed and Sealed this
Thirtieth Day of May, 2017

Michelle K. Lee
*Director of the United States Patent and Trademark Office*